(12) United States Patent
Katayama

(10) Patent No.: US 12,266,201 B2
(45) Date of Patent: Apr. 1, 2025

(54) INFORMATION PROCESSING APPARATUS, DOCUMENT MANAGEMENT SYSTEM, AND NON-TRANSITORY COMPUTER READABLE MEDIUM

(71) Applicant: FUJIFILM Business Innovation Corp., Tokyo (JP)

(72) Inventor: Yuzo Katayama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 502 days.

(21) Appl. No.: 17/168,181

(22) Filed: Feb. 5, 2021

(65) Prior Publication Data

US 2022/0051007 A1 Feb. 17, 2022

(30) Foreign Application Priority Data

Aug. 14, 2020 (JP) .................................. 2020-136952

(51) Int. Cl.
| | |
|---|---|
| G06V 30/40 | (2022.01) |
| G06F 40/103 | (2020.01) |
| G06V 30/14 | (2022.01) |
| G06V 30/146 | (2022.01) |

(52) U.S. Cl.
CPC ............ G06V 30/40 (2022.01); G06F 40/103 (2020.01); G06V 30/1448 (2022.01); G06V 30/147 (2022.01)

(58) Field of Classification Search
CPC .. G06V 30/40; G06V 30/1448; G06V 30/147; G06V 30/412; G06V 2201/09; G06F 40/103; G06F 16/168; G06F 16/148

USPC ......................................................... 715/273
See application file for complete search history.

(56) References Cited

U.S. PATENT DOCUMENTS

| | | | | |
|---|---|---|---|---|
| 10,032,072 | B1* | 7/2018 | Tran .......................... | G06F 18/28 |
| 2003/0018632 | A1* | 1/2003 | Bays ........................ | G06F 16/907 |
| 2008/0141117 | A1* | 6/2008 | King ......................... | G06Q 30/02 |
| | | | | 714/48 |
| 2014/0019852 | A1* | 1/2014 | Numata ................. | G06F 40/134 |
| | | | | 715/255 |
| 2018/0246569 | A1* | 8/2018 | Arakawa .................. | G06F 3/013 |
| 2020/0374589 | A1* | 11/2020 | Li ........................ | H04N 21/4826 |
| 2021/0042516 | A1* | 2/2021 | Panakkal .............. | G06V 30/413 |

FOREIGN PATENT DOCUMENTS

| | | |
|---|---|---|
| JP | 2008040753 | 2/2008 |
| JP | 2013050979 | 3/2013 |
| WO | 2016043320 | 3/2016 |

OTHER PUBLICATIONS

Kano (JP2008078942A, published Apr. 3, 2088, pp. 1-14) (Year: 2008).*

(Continued)

*Primary Examiner* — Mohammed H Zuberi
*Assistant Examiner* — Ahamed I Nazar
(74) *Attorney, Agent, or Firm* — JCIPRNET

(57) ABSTRACT

An information processing apparatus includes a processor configured to extract from one or more electronic documents viewed before by a user a region of interest on which the user focuses attention and create a thumbnail of an electronic document to be viewed by the user in accordance with the region of interest by extracting an image corresponding to the region of interest from the electronic document.

13 Claims, 13 Drawing Sheets

(56) References Cited

OTHER PUBLICATIONS

Toderici et al., Variable Rate Image Compression With Recurrent Neural Networks (Year: 2016).*
Toderici et al. Variable Rate Image Compression With Recurrent Neural Networks, published Mar. 1, 2016, pp. 1-12. (Year: 2016).*
Kano, JP 2008078942 A, published Aug. 17, 2008, pp. 1-14 (Year: 2008).*
"Notice of Reasons for Refusal of Japan Counterpart Application", issued on Mar. 5, 2024, with English translation thereof, p. 1-p. 6.

* cited by examiner

USER ATTRIBUTE: PERSON CHARGED WITH INVOICE SORTING
PROCESS: INVOICE SORTING
REGION OF INTEREST: COMPANY LOGO, COMPANY NAME
LEARNING OBJECT: USER ATTRIBUTE, PROCESS, IMAGE SEARCHED FOR

USER ATTRIBUTE: PERSON CHARGED WITH INVOICE AUDIT
PROCESS: INVOICE DATE CHECKING
REGION OF INTEREST: PAGE INCLUDING TERM "INVOICE DATE"
LEARNING OBJECT: USER ATTRIBUTE, PROCESS, VALUE FOR TERM SEARCHED FOR

USER ATTRIBUTE: PERSON CHARGED WITH INVOICE SORTING
PROCESS: OCR OF INVOICES
REGION OF INTEREST: COMPANY LOGO, COMPANY NAME
LEARNING OBJECT: USER ATTRIBUTE, PROCESS, IMAGE EXTRACTED BY USING OCR

USER ATTRIBUTE: PERSON CHARGED WITH INVOICE AUDIT
PROCESS: INVOICE DATE CHECKING
REGION OF INTEREST: VALUE FOR INVOICE DATE
LEARNING OBJECT: USER ATTRIBUTE, PROCESS,
             NEIGHBORING TERM OF ON-SCREEN OCR

USER ATTRIBUTE: PERSON CHARGED WITH INVOICE AUDIT
PROCESS: INVOICE DATE CHECKING
REGION OF INTEREST: PAGE INCLUDING TERM "INVOICE DATE"
LEARNING OBJECT: USER ATTRIBUTE, PROCESS, KEY AND VALUE FOR OCR

FIG. 11

| DOCUMENT NAME | USER ATTRIBUTE | PROCESS | RELEVANT INFORMATION |
|---|---|---|---|
| DOCUMENT A | PERSON CHARGED WITH INVOICE AUDIT | INVOICE DATE CHECKING | INVOICE DATE 1/31/2020 |
| DOCUMENT B | PERSON CHARGED WITH INVOICE AUDIT | INVOICE DATE CHECKING | INVOICE DATE 12/31/2019 |
| DOCUMENT C | PERSON CHARGED WITH INVOICE AUDIT | INVOICE DATE CHECKING | ... |

INFORMATION PROCESSING APPARATUS, DOCUMENT MANAGEMENT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-136952 filed Aug. 14, 2020.

BACKGROUND

(i) Technical Field

The present disclosure relates to an information processing apparatus, a document management system, and a non-transitory computer readable medium.

(ii) Related Art

It has been a practice in the art to present a thumbnail for checking content of each electronic document and enable a user to seek a target electronic document by using such a thumbnail. Each thumbnail is presented, for example, as a reduced image representing content of an electronic document.

Japanese Unexamined Patent Application Publication No. 2008-40753 discloses an image processing apparatus in which a keyword-search processor performs keyword-search processing on text information in image information in response to a server apparatus receiving a search key. A display-screen-control processor displays a thumbnail of the page found by the search, text information in the page, and an image of a representing portion of the page.

Japanese Unexamined Patent Application Publication No. 2013-50979 discloses an information processing apparatus that updates a document table and a page table based on editing information in response to the completion of editing or viewing a document. After the update, the level of emphasis of each page in the page table is calculated based on a thumbnail priority condition determined by a user, and the thumbnail image that represents the document is changed to the thumbnail of the page having the highest level of emphasis. For example, if only the editing time is designated as the priority condition, a numerical value that decreases as the editing time of a page decreases is assigned to the level of emphasis of each page in the page table.

SUMMARY

The feature of a thumbnail of an electronic document does not necessarily contain characteristic information that represents a difference between a target electronic document sought by a user and another electronic document. If the thumbnail does not represent the characteristic information, it is difficult to distinguish between the target electronic document sought by the user and another electronic document. In addition, it is hoped that an image presented as a thumbnail matches the purpose of each user.

Aspects of non-limiting embodiments of the present disclosure relate to providing an information processing apparatus, a document management system, and a non-transitory computer readable medium that can more easily create a characteristic thumbnail suitable to each user than in the case where a user configures settings to create thumbnails.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to extract from one or more electronic documents viewed before by a user a region of interest on which the user focuses attention and create a thumbnail of an electronic document to be viewed by the user in accordance with the region of interest by extracting an image corresponding to the region of interest from the electronic document.

BRIEF DESCRIPTION OF THE DRAWINGS

An exemplary embodiment of the present disclosure will be described in detail based on the following figures, wherein:

FIG. 11 is an illustration depicting a learning model created when a region of interest is extracted in the way depicted in FIG. 10;

DETAILED DESCRIPTION

Overall Description of Document Management System 1

Figure 1:
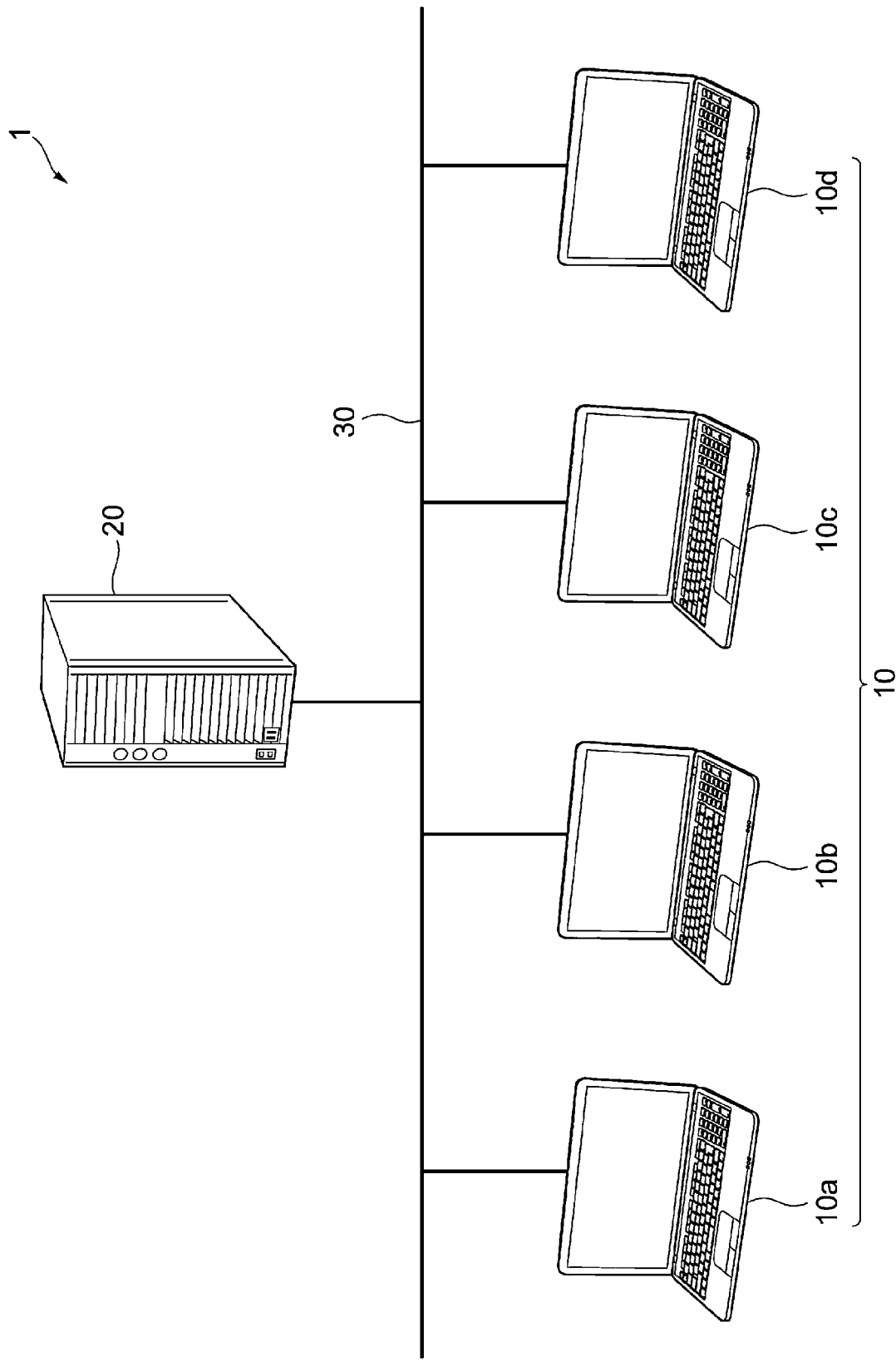
FIG. 1 is an illustration depicting an example configuration of a document management system according to the present exemplary embodiment.

FIG. 1 is an illustration depicting an example configuration of a document management system 1 according to the present exemplary embodiment.

The document management system 1, which is depicted in FIG. 1, has a configuration in which terminal apparatuses 10a to 10d, which are also referred to as terminal apparatuses 10, and a document management server 20 are connected to each other by using a network 30.

In FIG. 1, four pieces are depicted as the terminal apparatuses 10, but the number of the terminal apparatuses 10 may be any number more than one.

In FIG. 1, the document management system 1 performs, for example, processing on electronic documents. Examples of processing on electronic documents include creation, checking, correction, permission, and approval of electronic documents.

In the present exemplary embodiment, the term "electronic document" refers to text information and/or image information in an electronic format. The format, data structure, and the like of the electronic document are not particularly limited as long as the electronic document can be handled by each of the terminal apparatuses 10 and the document management server 20. Examples of the electronic document in the present exemplary embodiment include business forms. Specific examples of a business form include a quotation, an invoice, a detailed report, a form for requesting approval of a proposal, and an application form.

In the document management system 1, which is depicted in FIG. 1, an electronic document is circulated, for example, by the terminal apparatus 10a, the terminal apparatus 10b, the terminal apparatus 10c, and the terminal apparatus 10d in this order. The terminal apparatuses 10a to 10d are operated by respective users, and the electronic document is processed by these users. Each of these users is assigned a corresponding predetermined operation to be performed on the electronic document. These operations include creation, checking, correction, and permission of the electronic document, and may be referred to as predetermined processes performed by the respective users. These processes may also be referred to as steps in which the users process the electronic document. The document management server 20 performs management of processed electronic documents, such as transmission, reception, and storage of the electronic documents.

The terminal apparatuses 10 each perform processing on electronic documents in accordance with a user operation. Examples of the terminal apparatuses 10 include computing devices such as a general-purpose personal computer (PC), a mobile computer, a cellular phone, a smartphone, and a tablet. Each of the terminal apparatuses 10 runs various kinds of application software under the control by an operating system (OS) and thereby performs processing on electronic documents managed by the document management server 20.

The document management server 20 is an example of an information processing apparatus that manages electronic documents and is a server computer that manages the document management system 1 as a whole. The document management server 20, for example, authenticates the users who operate the terminal apparatuses 10 and transmits an electronic document to each of the terminal apparatuses 10 for the processing on the electronic document in the corresponding process. The document management server 20 also receives an electronic document processed by each user from the corresponding terminal apparatus 10 and stores the received electronic document. Further, the document management server 20 transmits the processed electronic document to the terminal apparatus 10 of the user who performs the next process. These procedures are repeated thereafter, and a series of processing is performed on the electronic document.

The document management server 20 also creates thumbnails used by the users to select an electronic document to be processed, and the processing of creating thumbnails will be described below in detail. The item referred to as a "thumbnail" is an image used to distinguish electronic documents in a screen. The users refer to, for example, thumbnails and names of electronic documents and select an electronic document to be processed.

The terminal apparatuses 10 and the document management server 20 each include a central processing unit (CPU) as a calculating unit, a main memory as a memory unit, and a storage unit such as a hard disk drive (HDD) and a solid state drive (SSD). The CPU is an example of a processor and executes various kinds of software including the OS (system software) and application programs (application software). The main memory is a storage region to store the various kinds of software, data to be used for execution of the various kinds of software, and the like. The storage unit is a storage region to store data that is input to the various kinds of software, data that is output from the various kinds of software, and the like.

Further, the terminal apparatuses 10 and the document management server 20 each include a communication interface (hereinafter, referred to as a "communication I/F") for external communication, a display mechanism including a video memory and a display, and an input device including a keyboard, a mouse, and a touch panel.

The network 30 is a communication unit used for information communication between the terminal apparatuses 10 and the document management server 20, and examples of the network 30 include the Internet, a local area network (LAN), and a wide area network (WAN). The communication network used for data communication may be wired or wireless, or alternatively wireline and wireless communications may be combined. The terminal apparatuses 10 and the document management server 20 may be connected to each other via a plurality of networks or communication lines by using relaying apparatuses such as gateway apparatuses and routers.

Description of Functional Configuration of Document Management Server 20

Figure 2:
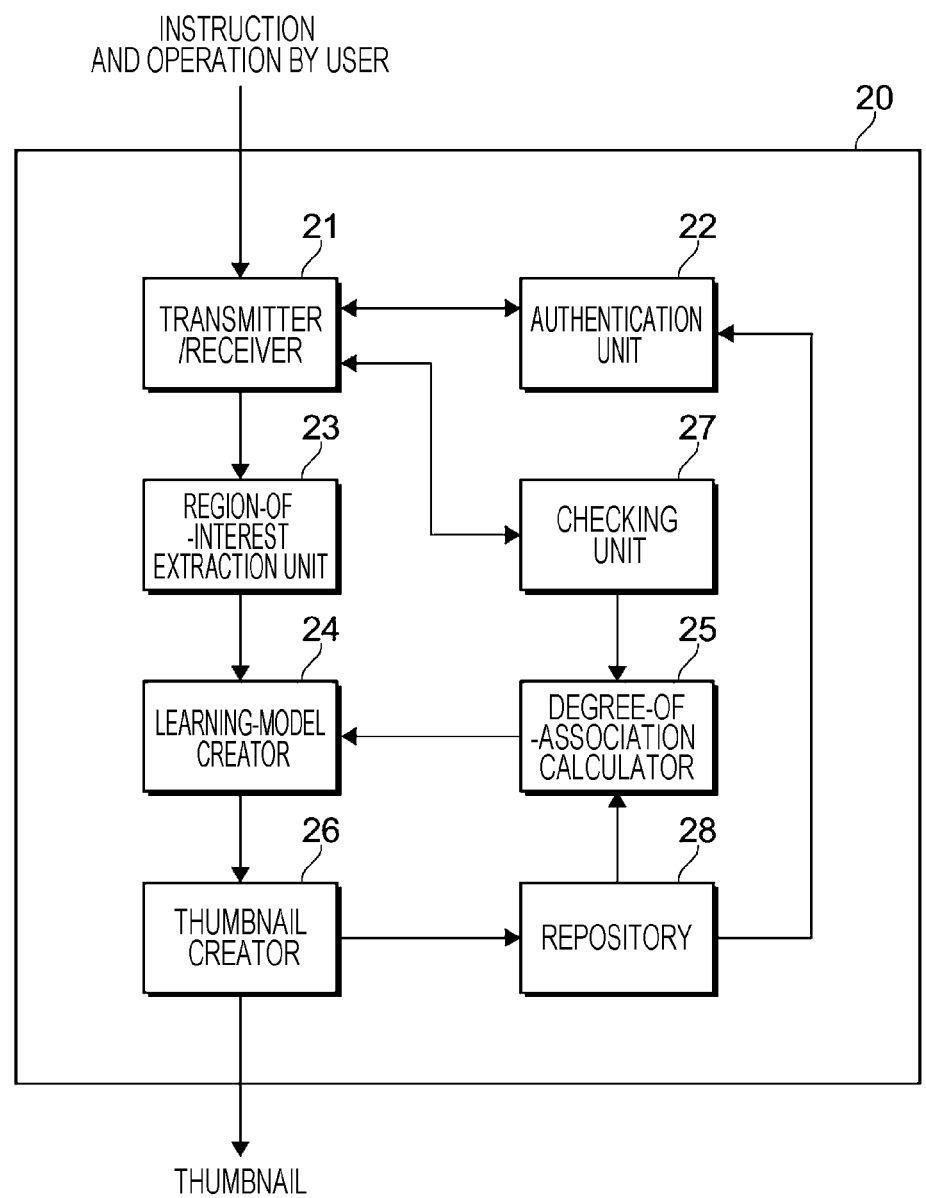
FIG. 2 is a block diagram describing an example functional configuration of a document management server.

FIG. 2 is a block diagram describing an example functional configuration of the document management server 20.

FIG. 2 depicts functions selected from various functions that the document management system 1 has, and the selected functions are related to the present exemplary embodiment.

The document management server 20, which is depicted in FIG. 2, includes a transmitter/receiver 21, an authentication unit 22, a region-of-interest extraction unit 23, a learning-model creator 24, a degree-of-association calculator 25, a thumbnail creator 26, a checking unit 27, and a repository 28. The transmitter/receiver 21 transmits and receives an electronic document. The authentication unit 22 authenticates a user. The region-of-interest extraction unit 23 extracts a region of interest on which users focus attention in an electronic document. The learning-model creator 24 learns about the extracted region of interest and creates a learning model. The degree-of-association calculator 25 calculates a degree of association related to an electronic document. The thumbnail creator 26 creates a thumbnail of an electronic document in accordance with a learning model and a degree of association. The checking unit 27 checks with a user whether a thumbnail is appropriate. The repository 28 stores electronic documents and learning models.

The transmitter/receiver 21 transmits and receives electronic documents to and from the terminal apparatuses 10 via the network 30. The transmitter/receiver 21 corresponds to, for example, the communication I/F.

The authentication unit 22 authenticates a user by using a predetermined method. For example, the authentication unit 22 compares a set of a user identification (ID) and a password that is sent from a user and a set of a user ID and a password that is stored in the repository 28. If the two sets coincide with each other as a result of the comparison, the user is authenticated.

The region-of-interest extraction unit 23 extracts a region of interest, on which a user focuses attention, from electronic documents viewed before by the user.

In the present exemplary embodiment, the term "region of interest" refers to a region that is needed for the user to perform processing in each process that an electronic document undergoes, and the region is a target that the user wants to check. Specifically, the user finds in an electronic document a region pertinent to a process performed by the user and performs processing on the region. In other words, it can be said that the region is a region on which the user focuses attention.

The region of interest varies in an electronic document depending on a process performed by the user. For example, if the process concerns invoice sorting, the regions of interest, on which the user focuses attention, include the company logo and the company name of a company that is invoiced. If the process concerns invoice date checking of invoices, the region of interest, on which the user focuses attention, includes an invoice date. In other words, it can also be said that the region-of-interest extraction unit 23 extracts a region of interest in accordance with a process in which the user processes an electronic document.

In accordance with a region of interest extracted by the region-of-interest extraction unit 23, the learning-model creator 24 learns about relationships between a user attribute, a process, and the region of interest and creates a learning model. In this case, the term "user attribute" refers to an attribute with respect to the processing performed by the user on an electronic document. A user attribute may be set to, for example, an attribute representing an operation with which the user is charged in each process. For example, if the process concerns invoice sorting, the user attribute is a person charged with invoice sorting. If the process concerns invoice date checking of invoices, the user attribute is, for example, a person charged with invoice audit. A learning model may be created based on a user attribute, a process, and the region of interest by using an existing machine learning method.

The degree-of-association calculator 25 calculates a degree of association between user attributes and a degree of association between processes.

The term "degree of association" refers to a parameter representing a degree of similarity between a plurality of phrases. Specifically, the degree-of-association calculator 25 calculates a degree of association between user attributes by using a degree of similarity between the names of user attributes. For example, the names of user attributes "person charged with invoice sorting" and "person charged with invoice handling" bear a high degree of similarity, and thus the degree of association between the user attributes is high. In contrast, the names of user attributes "person charged with invoice sorting" and "person charged with document management" bear a low degree of similarity, and thus the degree of association between the user attributes is low. In addition, if a processing history indicates that similar items in similar electronic documents are processed, the degree of association between the user attributes may be set at a high level.

The degree-of-association calculator 25 calculates a degree of association between processes by using a degree of similarity between process names. For example, the process names "invoice date checking" and "invoice date confirmation" bear a high degree of similarity, and thus the degree of association between the processes is high. In contrast, the process names "invoice date checking" and "input of inspection result" bear a low degree of similarity, and thus the degree of association between the processes is low.

The degree-of-association calculator 25 may use an existing method to calculate the degree of association between user attributes and the degree of association between processes. For example, Word2 vec may be used to calculate the degrees of association. The degree of association may be determined, for example, in ten levels on a scale from 0.1 to 1.0. In this case, 0.1 indicates the lowest degree of association, and 1.0 indicates the highest degree of association.

The thumbnail creator 26 creates a set of thumbnails to be presented to a user in selecting an electronic document. The thumbnail creator 26 creates a set of thumbnails in accordance with a learning model created by the learning-model creator 24. Specifically, the thumbnail creator 26 creates a set of thumbnails of electronic documents to be viewed by a user in accordance with a region of interest by extracting images corresponding to the region of interest. In other words, a different set of thumbnails is created for a different region of interest. A region of interest is associated with a user attribute and a process in a learning model. Thus, it can also be said that a set of thumbnails is created for each user attribute and each process. In this way, if one of a user attributes and a process is different, a different thumbnail is created for a single electronic document.

In addition, the thumbnail creator 26 determines a set of thumbnails to be presented to users in accordance with degrees of association obtained for electronic documents. In this case, the thumbnail creator 26 presents the same set of thumbnails to the users if one of a degree of association between user attributes and a degree of association between processes is high. In an actual situation, the thumbnail creator 26 presents a set of thumbnails having the highest degree of association between the user attributes or between the processes.

This procedure is effective to create a set of thumbnails in a case where a user attribute or a process has been non-existent before and is newly created or in a case where objects to be learned about to create a learning model are scarce. In an example, it is assumed that a user who newly joins a team has a user attribute that differs from the pre-existent user attributes and is charged with a process that has been non-existent before. In this example, a degree of association between the user attribute of this user and the user attribute of each of the plurality of users who have been members of the team is calculated, and it is assumed that the highest degree of association is 0.5. Further, a degree of association between the process assigned to this user and the process assigned to each of the plurality of users who have been members of the team is calculated, and it is assumed that the highest degree of association is 0.8. In such a case, the thumbnail creator 26 presents to the user who newly joins the team the set of thumbnails created for the process having the degree of association equal to 0.8.

The checking unit 27 checks with a user to whom a set of thumbnails has been presented whether the set of thumbnails is appropriate. In other words, the checking unit 27 checks whether a presented set of thumbnails is suitable to each user. If it is determined that the user is able to easily distinguish each electronic document and easily select a necessary electronic document by using the presented set of thumbnails, the checking unit 27 does not provide an instruction for a change. In this case, the presented set of thumbnails is used without any change.

In contrast, if it is determined that the user is unable to easily distinguish each electronic document and easily select a necessary electronic document, the checking unit 27 provides an instruction for a change. In this case, the thumbnail creator 26 creates another set of thumbnails in accordance with the learning model.

It is considered that inconvenience of this type is likely to occur when the thumbnail creator 26 creates a set of thumbnails in accordance with degrees of association obtained for electronic documents. In such a case, as described above, the thumbnail creator 26 presents a set of thumbnails having the highest degree of association between the user attributes or between the processes. If the set of thumbnails is changed according to a user instruction, the thumbnail creator 26 presents a set of thumbnails having the next highest degree of association.

The authentication unit 22, the region-of-interest extraction unit 23, the learning-model creator 24, the degree-of-association calculator 25, the thumbnail creator 26, and the checking unit 27 correspond to, for example, the CPU.

The repository 28 stores data including electronic documents, learning models, thumbnails, and degrees of association. The repository 28 corresponds to, for example, the storage unit.

Detailed Description of Method of Creating Thumbnails

Next, a further detailed description will be given of procedures used by the document management server 20 to create thumbnails. In the following first and second examples, a specific description will be given of the procedures used by the document management server 20 to create thumbnails.

First Example

FIGS. 3, 4A, 4B, 5, 6A, and 6B are illustrations depicting procedures of creating thumbnails in the first example.

In the first example, the region-of-interest extraction unit 23 of the document management server 20 associates objects for which a user has searched with a process and extracts regions of interest.

Figure 3:
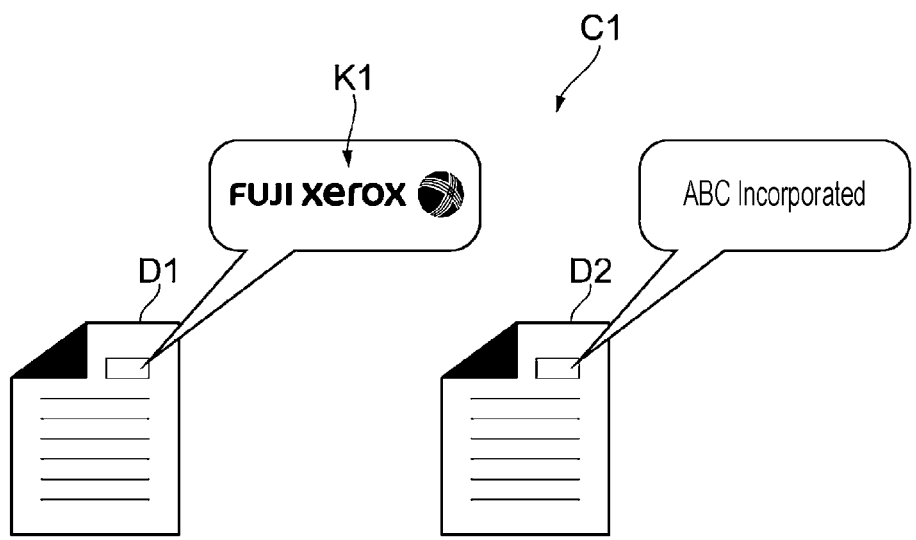
FIG. 3 is an illustration depicting a region of interest of a first type in a first example.

FIG. 3 is an illustration depicting a region of interest of a first type in the first example.

Here, a description is given of a case where an electronic document D1 and an electronic document D2 are presented to the terminal apparatus 10 as images and a user who views the presented images processes the electronic documents. Further, in FIG. 3, a region of interest C1 is presented in a case where the user attribute is a person charged with invoice sorting and the process is invoice sorting.

In this case, the region of interest C1 is a region required for invoice sorting and is, for example, a company logo or a company name. Specifically, the region of interest C1 in this case is a company logo K1 in the electronic document D1 and "ABC Incorporated" in the electronic document D2.

In this situation, the region-of-interest extraction unit 23 designates as the region of interest C1 an image searched for by the user in each of the electronic documents D1 and D2.

In this case, for example, if the user enters the term "logo" as a word set for the search and performs the search, the company logo K1 is found in the electronic document D1, and an image representing "ABC Incorporated" is found in the electronic document D2. Then, the region-of-interest extraction unit 23 designates each of these images as the region of interest C1.

If the region of interest C1 is extracted in this way, the learning-model creator 24 designates as learning objects the user attribute "person charged with invoice sorting", the process "invoice sorting", and the region of interest C1, which is an image searched for by the user. The learning-model creator 24 learns about these objects in association with each other and creates a learning model.

Figure 4:
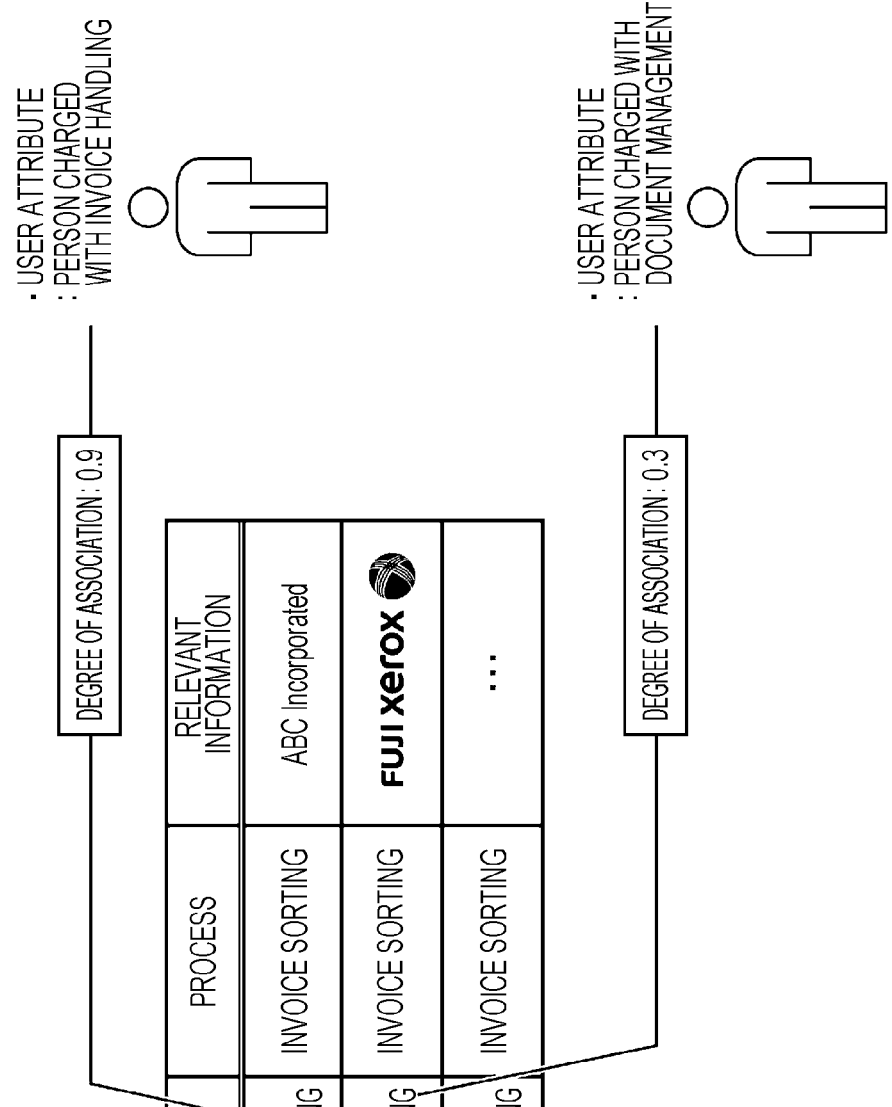
FIG. 4A is an illustration depicting a learning model created when a region of interest is extracted in the way depicted in FIG. 3, and FIG. 4B indicates a situation in which a degree of association between user attributes is applied to the learning model depicted in FIG. 4A.

FIG. 4A is an illustration depicting a learning model M1 created when the region of interest C1 is extracted in the way depicted in FIG. 3.

In the learning model M1, which is depicted in FIG. 4A, a document name, a user attribute, a process, and a piece of relevant information are associated with each other and learned about. Of these terms, the term "document name" refers to the name attached to the electronic document D1 or D2 described above. The region of interest C1, which is extracted by the region-of-interest extraction unit 23, is stored as the "relevant information". Further, the terms "user attribute" and "process" refer to the user attribute and the process described above, respectively.

FIG. 4B indicates a situation in which the degree of association between user attributes is applied to the learning model M1, which is depicted in FIG. 4A.

As described above, the thumbnail creator 26 determines a set of thumbnails to be presented to users in accordance with degrees of association obtained for electronic documents. The user attribute in the learning model M1, which is depicted in FIG. 4A, is "person charged with invoice sorting".

In contrast, if the user attribute of a different user is "person charged with invoice handling", the names of the user attributes are similar, and the degree of association between the user attributes is high. FIGS. 4A and 4B depict a situation in which the degree-of-association calculator 25 calculates the degree of association between the user attributes and obtains "0.9". In this case, the set of thumbnails presented to the different user, who is referred to as a "person charged with invoice handling", may be the same as the set of thumbnails presented to the "person charged with invoice sorting".

In contrast, if the user attribute of a different user is "person charged with document management", the names of the user attributes are dissimilar, and the degree of association between the user attributes is low. FIGS. 4A and 4B depict a situation in which the degree-of-association calculator 25 calculates the degree of association between the user attributes and obtains "0.3". In this case, the set of thumbnails presented to the different user, who is referred to as a "person charged with document management", may be different from the set of thumbnails presented to the "person charged with invoice sorting".

Figure 5:
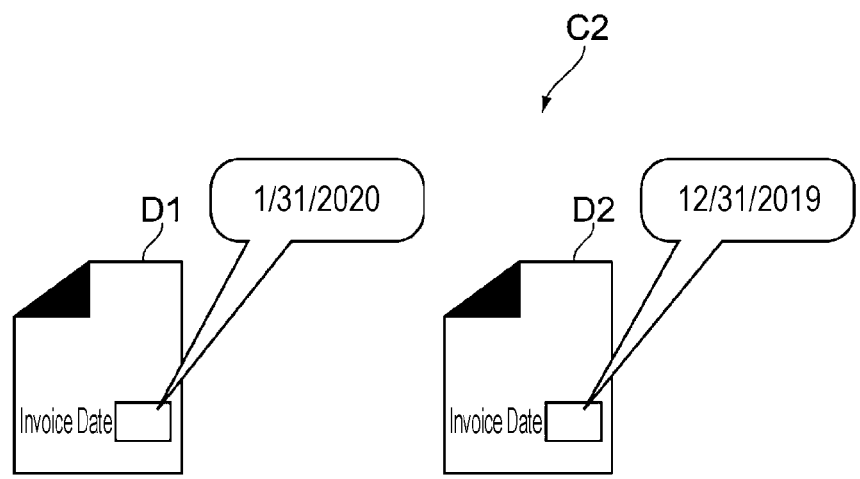
FIG. 5 is an illustration depicting a region of interest of a second type in the first example.

FIG. 5 is an illustration depicting a region of interest of a second type in the first example.

Here, a description is given of a case where the electronic document D1 and the electronic document D2 are presented to the terminal apparatus 10 as images and a user who views the presented images processes the electronic documents. Further, in FIG. 5, a region of interest C2 is presented in a case where the user attribute is a person charged with invoice audit and the process is invoice date checking.

In this case, the region of interest C2 is a region required for invoice date checking and is, for example, an invoice date. Specifically, the region of interest C2 in this case is "Jan. 31, 2020" in the electronic document D1 and "Dec. 31, 2019" in the electronic document D2.

In this situation, the region-of-interest extraction unit 23 designates as the region of interest C2 a value for the term searched for by the user in each of the electronic documents D1 and D2. In this case, for example, if the user enters "invoice date" as a term set for the search and performs the search, the term "Invoice Date" is found in each of the electronic documents D1 and D2. Then, the region-of-interest extraction unit 23 designates as the region of interest C2 each of "Jan. 31, 2020" and "Dec. 31, 2019", which are values for the term "Invoice Date".

If the region of interest C2 is extracted in this way, the learning-model creator 24 designates as learning objects the user attribute "person charged with invoice audit", the process "invoice date checking", and the region of interest C2, which includes a value for the term searched for by the user, learns about these learning objects in association with each other, and creates a learning model.

Figure 6:
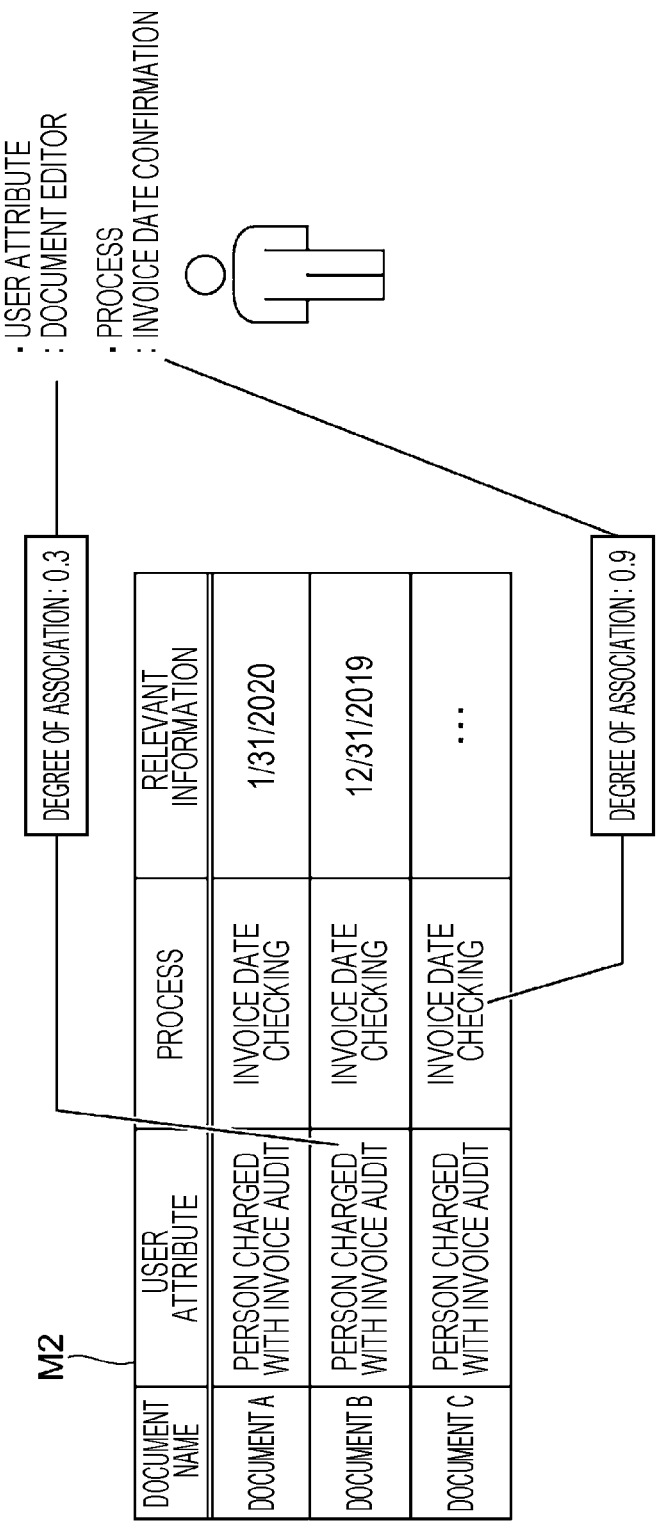
FIG. 6A is an illustration depicting a learning model created when a region of interest is extracted in the way depicted in FIG. 5, and FIG. 6B indicates a situation in which a degree of association between user attributes and a degree of association between processes are applied to the learning model depicted in FIG. 6A.

FIG. 6A is an illustration depicting a learning model M2 created when the region of interest C2 is extracted in the way depicted in FIG. 5.

As in the case in FIG. 4A, a document name, a user attribute, a process, and a piece of relevant information are associated with each other and learned about in the learning model M2, which is depicted in FIG. 6A. Here, the region of interest C2, which is extracted by the region-of-interest extraction unit 23, is stored as the "relevant information".

FIG. 6B indicates a situation in which the degree of association between user attributes and the degree of association between processes are applied to the learning model M2, which is depicted in FIG. 6A.

The user attribute in the learning model M2, which is depicted in FIG. 6A, is "person charged with invoice audit".

In contrast, if the user attribute of a different user is "document editor", the names of the user attributes are dissimilar, and the degree of association between the user attributes is low. FIGS. 6A and 6B depict a situation in which the degree-of-association calculator 25 calculates the degree of association between the user attributes and obtains "0.3". In contrast, if the process assigned to the different user is "invoice date confirmation", the names of the processes are similar, and the degree of association between the processes is high. FIGS. 6A and 6B depict a situation in which the degree-of-association calculator 25 calculates the degree of association between the processes and obtains "0.9". In this case, although the degree of association with the user attribute of the different user is low, the degree of association with the process assigned to the different user is high. Thus, the set of thumbnails presented to the different user may be the same as the set of thumbnails presented to the "person charged with invoice audit".

As described by using FIGS. 3 and 5, although the electronic documents D1 and D2 in FIG. 5 are the same as the electronic documents in FIG. 3, the region of interest differs depending on the process that the electronic documents undergo. In the example described above, the region of interest C1 is extracted if the process is invoice sorting, and the region of interest C2 is extracted if the process is invoice date checking. The region of interest C1 and the region of interest C2 are different regions.

Second Example

FIGS. 7-11 are illustrations depicting procedures of creating thumbnails in a second example.

In the second example, the region-of-interest extraction unit 23 of the document management server 20 extracts, for a process in which a user processes an electronic document, as a region of interest a region on which the user has performed character recognition in the image of the electronic document.

Figure 7:
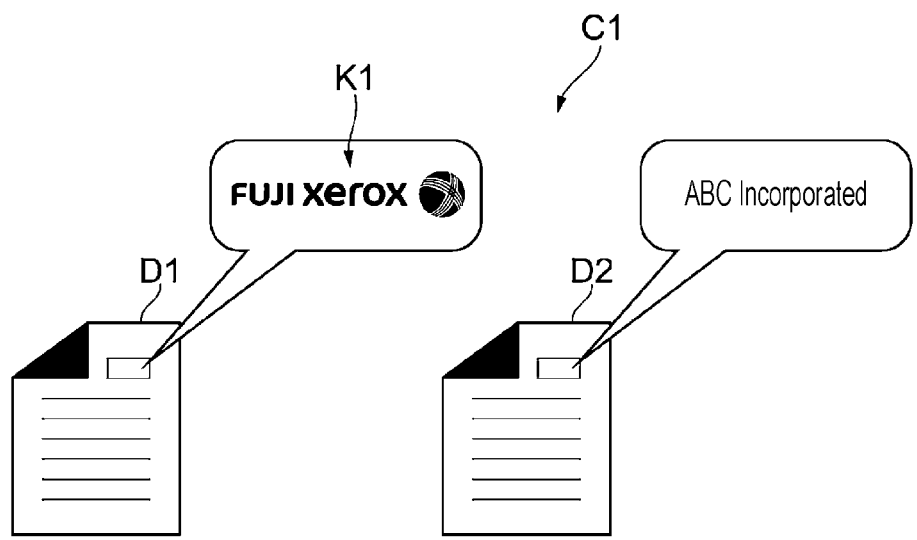
FIG. 7 is an illustration depicting a region of interest of the first type in a second example.

FIG. 7 is an illustration depicting a region of interest of a first type in the second example.

Here, a description is given of a case where the electronic document D1 and the electronic document D2 are presented to the terminal apparatus 10 as images and a user who views the presented images processes the electronic documents. Further, in FIG. 7, a region of interest C1 is presented in a case where the user attribute is a person charged with invoice sorting and the process is optical character recognition (OCR) of invoices. Application software performing OCR may be integrated into the application software performing the processes described above or may be separate application software.

In this case, the region of interest C1 is a region required for OCR of an invoice and is, for example, a company logo or a company name. Specifically, the region of interest C1 in this case is a company logo K1 in the electronic document D1 and "ABC Incorporated" in the electronic document D2.

In this situation, the region-of-interest extraction unit 23 designates as the region of interest C1 an image extracted as the company logo or the company name when the user performs OCR on the electronic document D1 or on the electronic document D2.

If the region of interest C1 is extracted in this way, the learning-model creator 24 designates as learning objects the user attribute "person charged with invoice sorting", the process "OCR of invoices", and the region of interest C1, which includes the image extracted as the company logo or the company name, learns about these learning objects in association with each other, and creates a learning model.

Figure 8:
FIG. 8 is an illustration depicting a learning model created when a region of interest is extracted in the way depicted in FIG. 7.

FIG. 8 is an illustration depicting a learning model M3 created when the region of interest C1 is extracted in the way depicted in FIG. 7.

As in the case in FIG. 4A, a document name, a user attribute, a process, and a piece of relevant information are associated with each other and learned about in the learning model M3, which is depicted in FIG. 8. In contrast to the case in FIG. 4A, "OCR of invoices" is stored as the "process" here.

Figure 9:
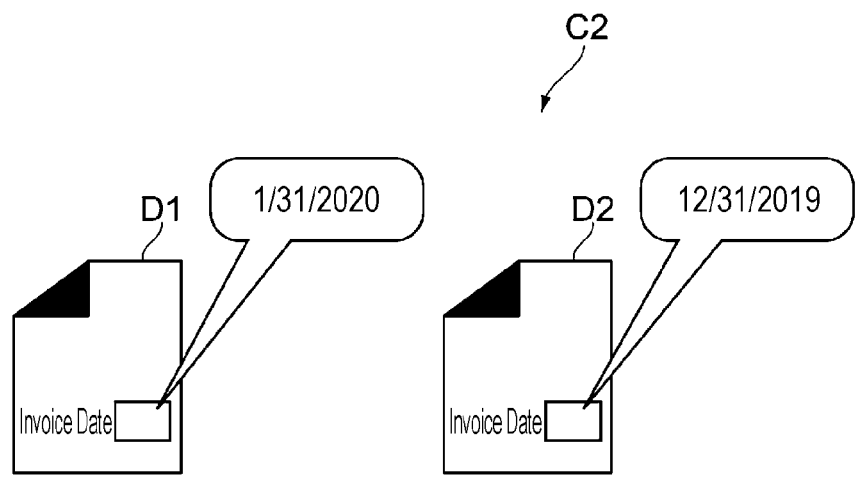
FIG. 9 is an illustration depicting a region of interest of the second type in the second example.

FIG. 9 is an illustration depicting a region of interest of a second type in the second example.

Here, a description is given of a case where the electronic document D1 and the electronic document D2 are presented to the terminal apparatus 10 as images and a user who views the presented images processes the electronic documents. Further, in FIG. 9, a region of interest C2 is presented in a case where the user attribute is a person charged with invoice audit and the process is invoice date checking.

In this case, the region of interest C2 is a region required for invoice date checking and is, for example, a Value for a KEY. Here, a "KEY" is an item that requests a value in a predetermined format in an electronic document, and a "Value" is a value for a KEY. Specifically, the regions of interest C2 in this case are "Jan. 31, 2020" in the electronic document D1 and "Dec. 31, 2019" in the electronic document D2. Each of the regions of interest C2 "Jan. 31, 2020" and "Dec. 31, 2019" is the Value for the KEY "Invoice Date".

In this situation, the region-of-interest extraction unit 23 designates as the region of interest C2 a character string adjacent to a region on which the user has performed OCR in each of the electronic documents D1 and D2. In this case, for example, the user performs OCR on a region that is relevant to the operation of the user. The OCR is, for example, on-screen OCR, and if a target region for OCR is selected from a displayed image by using a tool such as a mouse, the on-screen OCR is performed on the target region.

In this case, for example, the user performs OCR on a region for an invoice date in each of the electronic documents D1 and D2. Then, the region-of-interest extraction unit 23 designates as the region of interest C2 a character string obtained as a Value for "Invoice Date", on which OCR has been performed. In other words, the region-of-interest extraction unit 23 extracts as the region of interest C2 a region adjacent to the region on which the user has performed character recognition in the image of the electronic document. Here, "Jan. 31, 2020" and "Dec. 31, 2019", which are each obtained as a Value, are designated as the regions of interest C2. FIG. 9 depicts character strings each located in the adjacent region, and the character strings are each referred to as a neighboring term of on-screen OCR.

Then, the learning-model creator 24 designates as learning objects the user attribute "person charged with invoice audit", the process "invoice date checking", and the region of interest C2, which includes a character string obtained as the Value of the invoice date, learns about these learning objects in association with each other, and creates a learning model.

The learning model created when the region of interest C2 is extracted is, for example, the same as or similar to the learning model M2, which is depicted in FIG. 6A.

As described by using FIGS. 7 and 9, as in the case described by using FIGS. 3 and 5, although the electronic documents D1 and D2 in FIG. 9 are the same as the electronic documents in FIG. 7, the region of interest differs depending on the process that the electronic documents undergo.

Figure 10:
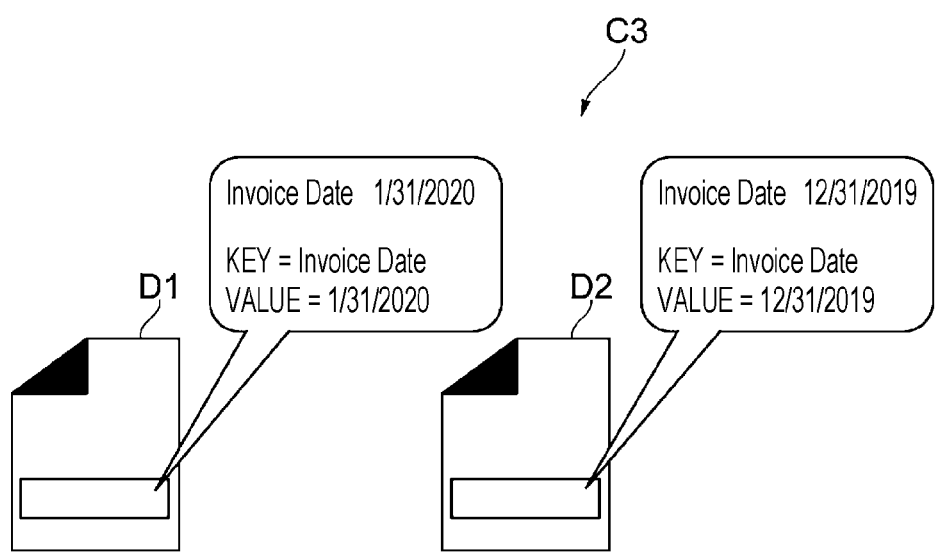
FIG. 10 is an illustration depicting a region of interest of a third type in the second example.

FIG. 10 is an illustration depicting a region of interest of a third type in the second example.

Here, a description is given of a case where the electronic document D1 and the electronic document D2 are presented to the terminal apparatus 10 as images and a user who views the presented images processes the electronic documents. Further, in FIG. 10, a region of interest C3 is presented in a case where the user attribute is a person charged with invoice audit and the process is invoice date checking.

In this case, the region of interest C3 is a region required for invoice date checking and is, for example, the KEY for an invoice date and the Value for the KEY. Specifically, the region of interest C3 in this case is "Invoice Date Jan. 31, 2020" in the electronic document D1 and "Invoice Date Dec. 31, 2019" in the electronic document D2. In this case, "Invoice Date" is the KEY, and "Jan. 31, 2020" and "Dec. 31, 2019" are each the Value for the KEY. In other words, the region-of-interest extraction unit 23 extracts as the region of interest C3 a region that forms a key (KEY)-value (Value) relationship as a result of character recognition.

In this situation, the region-of-interest extraction unit 23 designates as the region of interest C3 a region on which the user has performed OCR in each of the electronic documents D1 and D2. In this case, for example, the user performs OCR on a region that includes the KEY and the Value for the invoice date in each of the electronic documents D1 and D2. Then, the region-of-interest extraction unit 23 designates as the region of interest C3 character strings obtained as the KEY and the Value for the invoice date, on which OCR has been performed.

Then, the learning-model creator 24 designates as learning objects the user attribute "person charged with invoice audit", the process "invoice date checking", and the region of interest C3, which includes character strings obtained as the KEY and the Value for the invoice date, learns about these learning objects in association with each other, and creates a learning model.

FIG. 11 is an illustration depicting a learning model M4 created when the region of interest C3 is extracted in the way depicted in FIG. 10.

As in the case in FIG. 4A, a document name, a user attribute, a process, and a piece of relevant information are associated with each other and learned about in the learning model M4, which is depicted in FIG. 11. Here, the region of interest C3, which is extracted by the region-of-interest extraction unit 23, is stored as the "relevant information".

Figure 12A:
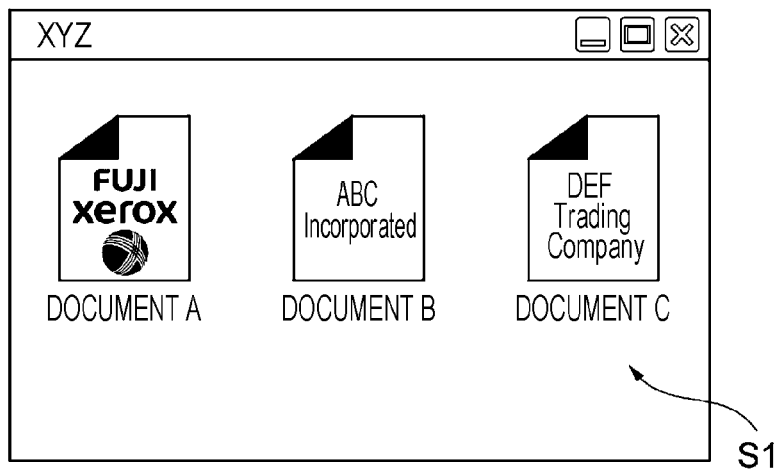
FIGS. 12A to 12C are illustrations each depicting an example set of thumbnails created by a thumbnail creator based on a learning model.
Figure 12B:
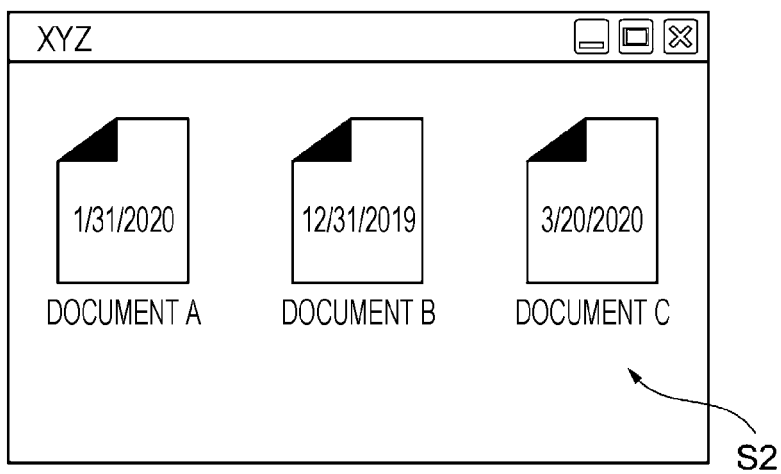
Figure 12C:
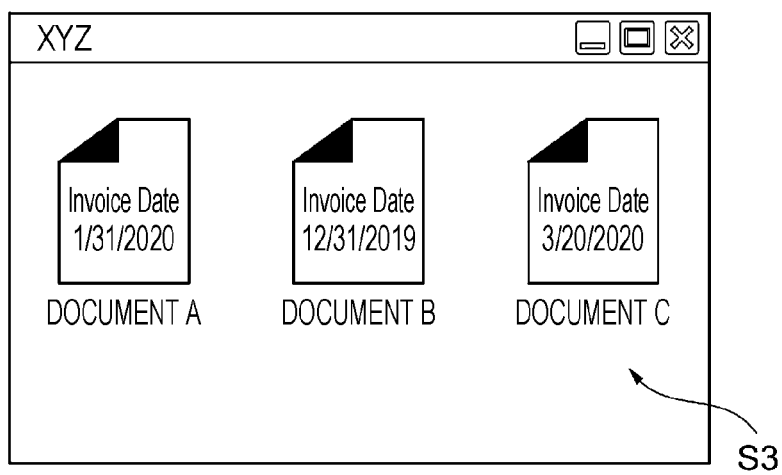

FIGS. 12A to 12C are illustrations each depicting an example set of thumbnails created by the thumbnail creator 26 based on a learning model.

Each illustration indicates how a set of thumbnails of electronic documents stored in a folder XYZ is presented when the folder XYZ is opened.

Of these Figures, FIG. 12A depicts the set of thumbnails created based on the learning model M1, which is depicted in FIG. 4A, or the learning model M3, which is depicted in FIG. 8. A set of thumbnails S1, which is depicted in FIG. 12A, represents relevant information in the learning model M1.

In addition, FIG. 12B depicts the set of thumbnails created based on the learning model M2, which is depicted in FIG. 6A. A set of thumbnails S2, which is depicted in FIG. 12B, represents relevant information in the learning model M2.

Further, FIG. 12C depicts the set of thumbnails created based on the learning model M4, which is depicted in FIG. 11. A set of thumbnails S3, which is depicted in FIG. 12C, represents relevant information in the learning model M4.

In these examples, pieces of relevant information in the learning models M1 to M4 are designated as the sets of thumbnails S1 to S3 without any change by way of non-limiting example. For example, a piece of relevant information may be combined with other image information to create a thumbnail, or a piece of relevant information may undergo processing such as enlarging, reducing, or emphasizing to create a thumbnail. In addition, a menu item to provide an instruction to create a set of thumbnails anew may be added to the folder, which will be described in detail below.

Description of Operation of Document Management Server 20

Figure 13:
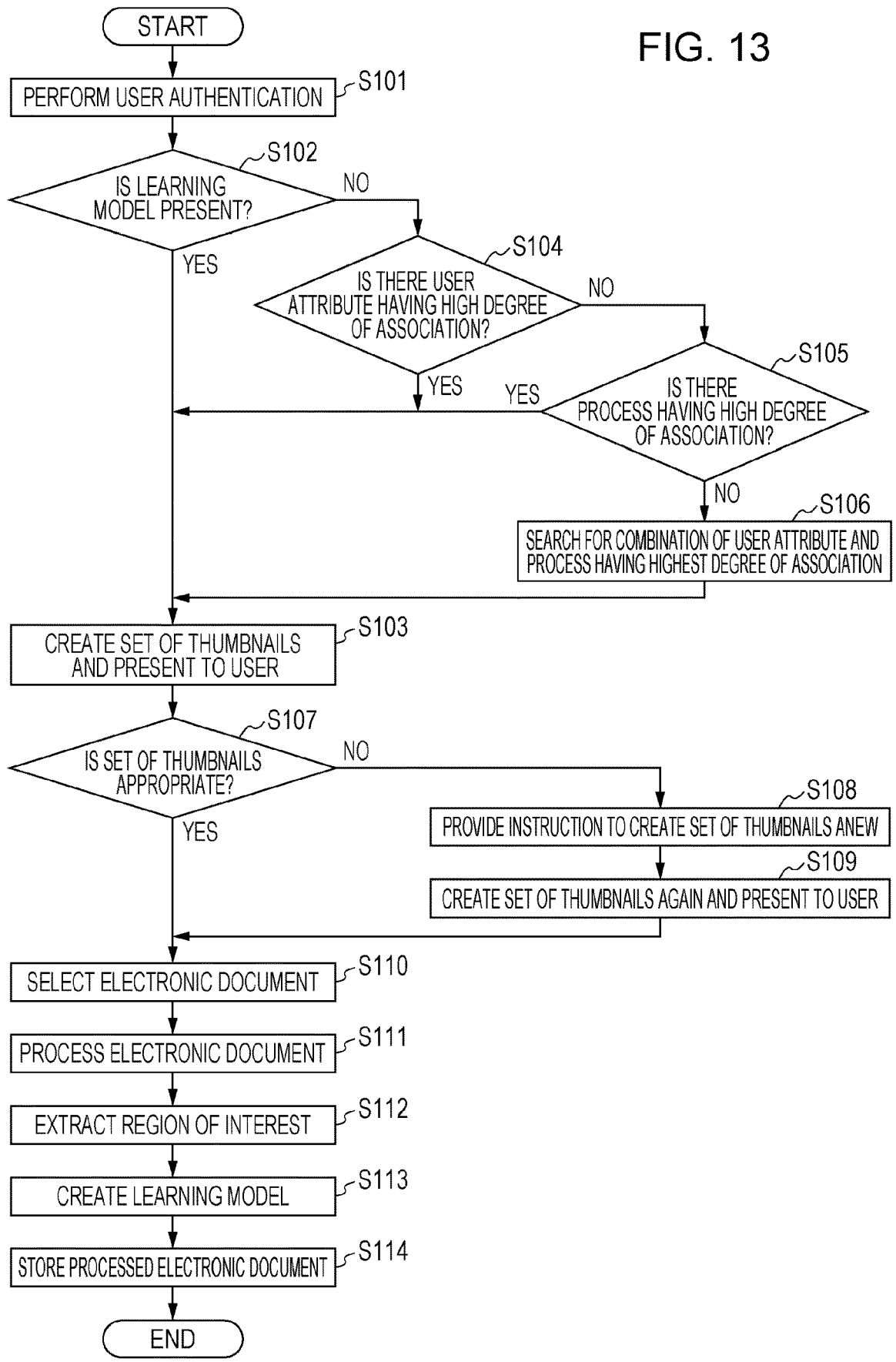
FIG. 13 is a flowchart describing an operation of the document management server.

FIG. 13 is a flowchart describing an operation of the document management server 20.

First, a user authenticates to the document management server 20 by using the terminal apparatus 10 (step S101). The authentication unit 22 performs the authentication.

Next, the transmitter/receiver 21 determines whether the user who has authenticated has processed an electronic document before and thus a learning model is present (step S102).

If it is determined that a learning model is present (Yes in step S102), the thumbnail creator 26 creates a set of thumbnails in accordance with the learning model and presents the set of thumbnails to the user (step S103).

In contrast, if it is determined that a learning model is not present (No in step S102), the degree-of-association calculator 25 determines whether there is a user attribute that is similar to the user attribute of the current user and that has a high degree of association with the user attribute of the current user (step S104). In an actual situation, the degree-of-association calculator 25 determines whether there is a user attribute having a degree of association with the user attribute of the current user, the degree of association being equal to or higher than a predetermined threshold.

If it is determined that there is a user attribute that is similar and that has a high degree of association (Yes in step S104), the thumbnail creator 26 creates a set of thumbnails in accordance with the learning model corresponding to the similar user attribute and presents the set of thumbnails to the current user (step S103).

In contrast, if it is determined that there is no similar user attribute (No in step S104), the degree-of-association calculator 25 determines whether there is a process that is similar to the process assigned to the current user and that has a high degree of association with the process assigned to the current user (step S105). In an actual situation, the degree-of-association calculator 25 determines whether there is a process having a degree of association with the process assigned to the current user, the degree of association being equal to or higher than a predetermined threshold.

If it is determined that there is a process that is similar and that has a high degree of association (Yes in step S105), the thumbnail creator 26 creates a set of thumbnails in accordance with the learning model corresponding to the similar process and presents the set of thumbnails to the current user (step S103).

In contrast, if it is determined that there is no similar process (No in step S105), the degree-of-association calculator 25 searches for and finds a combination of a user attribute and a process assigned to a different user, the combination having the highest degree of similarity and the highest degree of association with the combination of the user attribute and the process assigned to the current user (step S106).

The thumbnail creator 26 creates a set of thumbnails in accordance with the learning model corresponding to the combination having the highest degree of association and presents the set of thumbnails to the user (step S103).

After step S103, the user views the presented set of thumbnails and determines whether the set of thumbnails is appropriate (step S107).

If it is determined that the set of thumbnails is inappropriate (No in step S107), the user provides an instruction to create a set of thumbnails anew (step S108).

Then, the thumbnail creator 26 creates a set of thumbnails again in accordance with a learning model and presents the set of thumbnails to the user (step S109).

In this case, the thumbnail creator 26 creates a set of thumbnails again in accordance with the degree of association with the user attribute of a different user and the degree of association with the process assigned to the different user. In summary, the thumbnail creator 26 follows a user instruction and changes the set of thumbnails in accordance with the degrees of association.

Specifically, the thumbnail creator 26 creates a set of thumbnails in accordance with a learning model having a high degree of similarity and a high degree of association and presents the set of thumbnails to the user. If the user provides an instruction to create a set of thumbnails anew a plurality of times, the thumbnail creator 26 creates a set of thumbnails in order of the degree of similarity and the degree of association and presents the set of thumbnails to the user in this order.

In contrast, if it is determined that the set of thumbnails is appropriate (Yes in step S107), the user selects a necessary electronic document in accordance with the process assigned to the user (step S110).

The selected electronic document is retrieved from the repository 28 of the document management server 20, and the user processes the electronic document (step S111). Examples of the processing performed by the user at this time include extraction of, reference to, and search for an image in the electronic document.

The details of the processing are acquired by the transmitter/receiver 21 of the document management server 20 and the region-of-interest extraction unit 23 extracts a region of interest (step S112).

Then, the learning-model creator 24 creates a learning model in accordance with the region of interest extracted by the region-of-interest extraction unit 23 (step S113). The created learning model is stored in the repository 28.

After processing the electronic document, the user stores the processed electronic document. The processed electronic document is stored in the repository 28 of the document management server 20 (step S114).

As described above in detail, a characteristic set of thumbnails that is suitable to each user may be created in the present exemplary embodiment. In other words, a set of thumbnails created in the present exemplary embodiment contains characteristic information that represents a difference between a target electronic document sought by a user and another electronic document. In this way, the user easily selects a target electronic document from a plurality of electronic documents. In addition, in the present exemplary embodiment, a set of thumbnails is created by using a degree of association between user attributes and a degree of association between processes. In this way, even for users for whom no learning model is present, a characteristic set of thumbnails that is suitable to each user may be created.

Further, a set of thumbnails is created in a so-called automatic manner, and a user need not manually configure settings to create a set of thumbnails.

Description of Program

The processing performed by the document management server 20 according to the present exemplary embodiment described above is, for example, provided as a program such as software. The processing is realized by the cooperation between software and a hardware resource.

Thus, a program to execute the processing performed by the document management server 20 may also be understood as a program causing a computer to execute a process including extracting from one or more electronic documents viewed before by a user a region of interest on which the user focuses attention and creating a thumbnail of an electronic document to be viewed by the user in accordance with the region of interest by extracting an image corresponding to the region of interest from the electronic document.

A program realizing the present exemplary embodiment may be provided not only by transmission via a communication unit but also in a stored form in a recording medium, such as a compact-disc read-only memory (CD-ROM).

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to
    determine, from one or more electronic documents viewed before by a user, a region of interest on which the user focuses attention, and a process in which the user processes the one or more electronic documents viewed before by the user,
    create a learning model based on the region of interest in the one or more electronic documents viewed before by the user and the process in which the user processes the one or more electronic documents viewed before by the user,
    determine a designated region from an electronic document to be viewed by the user according to the learning model and a process to be performed by the user, and wherein the electronic document to be viewed by the user is different from the one or more electronic documents viewed before by the user,
    extract an image of the designated region from the electronic document to be viewed by the user,
    create a first thumbnail of the electronic document to be viewed by the user in accordance with the image of the designated region, and
    set the first thumbnail as a thumbnail of the electronic document to be viewed by the user.

2. The information processing apparatus according to claim 1,
    wherein the processor is configured to determine, for the process in which the user processes the one or more electronic documents viewed before by the user, the region of interest in association with an object for which the user has searched.

3. The information processing apparatus according to claim 1,
    wherein the processor is configured to determine, for the process in which the user processes the one or more electronic documents viewed before by the user, as the region of interest a region on which the user has performed character recognition in an image of the one or more electronic documents viewed before by the user.

4. The information processing apparatus according to claim 3,
    wherein the processor is configured to determine as the one or more electronic documents viewed before by the user a region adjacent to the region on which the user has performed character recognition in the image of the one or more electronic documents viewed before by the user.

5. The information processing apparatus according to claim 3,
    wherein the processor is configured to determine as the one or more electronic documents a region that forms a key-value relationship as a result of the character recognition.

6. The information processing apparatus according to claim 1,
    wherein the processor is configured to determine the first thumbnail in accordance with a degree of association obtained for the one or more electronic documents viewed before by the user.

7. The information processing apparatus according to claim 6,
    wherein the degree of association is a degree of association between user attributes.

8. The information processing apparatus according to claim 6,
    wherein the degree of association is a degree of association between processes in which the user processes the one or more electronic documents viewed before by the user.

9. The information processing apparatus according to claim 6,
    wherein the processor is configured to follow an instruction from the user and change the first thumbnail in accordance with the degree of association.

10. A document management system comprising:
a terminal apparatus that processes an electronic document; and
a document management apparatus that manages the electronic document,
wherein the document management apparatus includes
a processor configured to
    determine, from one or more electronic documents viewed before by a user, a region of interest on which the user focuses attention, and a process in which the user processes the one or more electronic documents viewed before by the user,
    create a learning model based on the region of interest in the one or more electronic documents viewed before by the user and the process in which the user processes the one or more electronic documents viewed before by the user,
    determine a designated region from an electronic document to be viewed by the user according to the learning model and a process to be performed by the user, and wherein the electronic document to be viewed by the user is different from the one or more electronic documents viewed before by the user,
    extract an image of the designated region from the electronic document to be viewed by the user,
    create a first thumbnail of the electronic document to be viewed by the user in accordance with the image of the designated region, and
    set the first thumbnail as a thumbnail of the electronic document to be viewed by the user.

11. A non-transitory computer readable medium storing a program causing a computer to execute a process for information processing, the process comprising:
    determining, from one or more electronic documents viewed before by a user, a region of interest on which the user focuses attention, and a process in which the user processes the one or more electronic documents viewed before by the user;
    creating a learning model based on the region of interest in the one or more electronic documents viewed before by the user and the process in which the user processes the one or more electronic documents viewed before by the user;

determining a designated region from an electronic document to be viewed by the user according to the learning model and a process to be performed by the user, and wherein the electronic document to be viewed by the user is different from the one or more electronic documents viewed before by the user;

extracting an image of the designated region from the electronic document to be viewed by the user;

creating a first thumbnail of the electronic document in accordance with the image of the designated region; and setting the first thumbnail as a thumbnail of the electronic document to be viewed by the user.

12. The information processing apparatus according to claim 1, wherein the one or more electronic documents viewed before by the user comprise a first electronic document and a second electronic document, wherein the user performs a first process on a first region of interest in the first electronic document, wherein the user performs a second process on a second region of interest in the second electronic document, and wherein the processor creates the learning model based on the first process, the first region of interest in the first electronic document, the second process, and the second region of interest in the second electronic document.

13. The information processing apparatus according to claim 1, wherein the processor is further configured to determine, from one or more electronic documents viewed before by another user, a region of interest on which the another user focuses attention, and a process in which the another user processes the one or more electronic documents viewed before by the another user, update the learning model based on the region of interest in the one or more electronic documents viewed before by the another user and the process in which the another user processes the one or more electronic documents viewed before by the another user, determine and extract an image of another designated region from an electronic document to be viewed by the another user according to the updated learning model and a process to be performed by the another user, create a second thumbnail of the electronic document to be viewed by the another user in accordance with the image of the another designated region, and set the second thumbnail as a thumbnail of the electronic document to be viewed by the another user, wherein the electronic document to be viewed by the another user is the same as the electronic document to be viewed by the user, and wherein the second thumbnail is different from the first thumbnail.

\* \* \* \* \*